Sept. 26, 1933.  O. S. SELLS ET AL  1,927,957
CORN DEBUTTER
Filed July 2, 1929   5 Sheets-Sheet 1

Fig. 1.

Inventors
Ogden S. Sells
Henry J. Wheeler
By Popp & Powers
Attorneys

Fig. 2.

Sept. 26, 1933. O. S. SELLS ET AL 1,927,957
CORN DEBUTTER
Filed July 2, 1929 5 Sheets-Sheet 3

Inventors
Ogden S. Sells
Henry J. Wheeler
By Pepper Powers
Attorneys

Sept. 26, 1933.    O. S. SELLS ET AL    1,927,957
CORN DEBUTTER
Filed July 2, 1929    5 Sheets-Sheet 4

Inventors
Ogden S. Sells
Henry J. Wheeler
By Popp + Powers
Attorneys

Patented Sept. 26, 1933

1,927,957

UNITED STATES PATENT OFFICE 1,927,957

CORN DEBUTTER

Ogden S. Sells, San Francisco, Calif., and Henry J. Wheeler, Buffalo, N. Y., assignors to Sprague-Sells Corporation, Hoopeston, Ill., a corporation of Delaware Application July 2, 1929. Serial No. 375,445

13 Claims. (Cl. 146—84)

This invention relates to a corn husker and more particularly to a corn husker in which the ears of corn are individually placed upon a conveyer which carries the ears past gaging, debutting and husk shredding devices and delivers it to a husking device from which the husked ear is discharged.

The principal object of this invention is to provide a simple and efficient corn husker of this character which severs the butt at the proper place regardless of the size or shape of the ear, and delivers the same to a series of husking rolls against which each ear is individually held for successive periods to insure complete removal of the husks and silk.

Another object is to provide an ear placing device which engages each ear while being conveyed transversely and moves it endwise and butt first against the gaging devices, the movement of the placer being so timed with reference to the conveyer that its sole effect is to move the ear endwise and does not otherwise alter the position of the ear.

A further object is to provide an ear gaging device comprising a movable shoe and stationary shoulder between which the butts of the ears are received and positioned with reference to the debutting knives, in which the shoe is moved in response to the diameter of the ear being gaged to insure the severing of the butt of each ear of corn at the proper place regardless of the diameter or size of the ear.

Another aim is to provide a husker of this character in which each ear, after being debutted, is confined in an individual pocket of a rotary member which is turned by an intermittent gear mechanism and successively presents each ear to successive pairs of cooperating husking rolls and holds the ear in engagement with each pair of rolls for a definite period of time so as to insure the complete removal of the husks and silk from the ears of corn.

Other objects are to provide a husker which operates on ears of various sizes and shapes in which there is little danger of the ears becoming stuck, jammed or misplaced while passing through the machine and in which any such ears can be easily removed, and to provide a machine which is accessible for repairs or adjustments and will not readily become clogged with silk or pieces of husk.

In the accompanying drawings.

Similar reference numerals refer to similar parts in each of the several views.

In the machine shown in the drawings, the ears are placed at opposite sides of the machine, and on each side counterpart mechanisms are provided for placing, gaging, shredding, debutting and husking the ears.

In its general organization the invention comprises a horizontal feeding table around which a conveyer passes which has flights or bars for propelling the ear sidewise from one end of the table to the other, a diagonally moving endless placing device engaging the under side of each ear and moving the ear butt first toward a gaging shoe and shoulder, a finger in the path of each ear and raised to different heights in accordance with the varying diameters of the ears, means operatively connecting the finger and the gage shoe so that the gage shoe is moved toward and from the gage shoulder to adapt it to the different sized ears presented, a shredding finger mounted on the table in the path of the ears to shred or tear the husks, a vertical way through which each ear is conveyed and placed in one of the pockets of a rotary drum or carrier, two pairs of cooperating husking rolls arranged under the drum and means for imparting a step-by-step movement to said drum whereby each ear is first presented and held in engagement with the first pair of husking rolls and is then moved and held in engagement with the second pair of husking rolls and then discharged.

Figure 6:
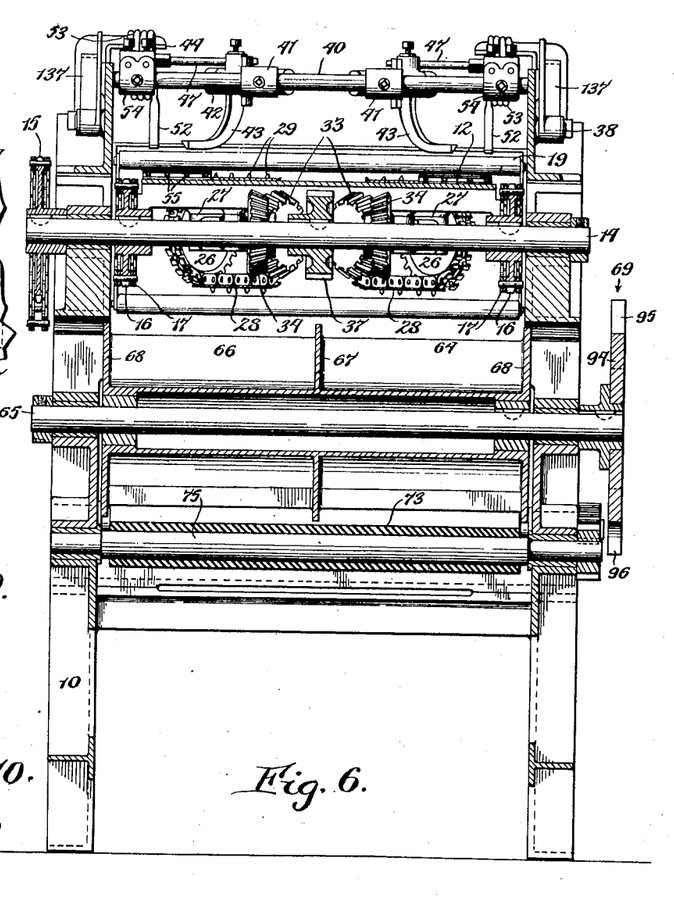
Figure 6 is a vertical transverse section taken on line 6—6, Fig. 5.

The operating parts of the present invention are supported by a frame 10 which may be of any suitable construction and is preferably formed to provide a forwardly extending part 11 which supports a horizontal plate 12 forming the feeding table. Journalled in the frame 10 at opposite ends and below the table 12 are two transverse conveyer shafts 13 and 14, the rear shaft 14 forming the driving shaft and carrying a driving sprocket 15 at one end. Each of the conveyer shafts 13 and 14 carries a pair of sprocket wheels 16 which carry a pair of conveyer chains 17. These conveyer chains 17 are arranged adjacent the sides of the table 12 and the upper stretch of each is arranged substantially even with the upper table surface as shown in Fig. 6, while the lower stretch is arranged below the table. Each of the conveyer chains 17 carries a plurality of spaced arms 18 which are secured to the chains in any suitable manner and project outwardly therefrom. To the outer ends of each of the corresponding arms of both chains, cross rods or bars 19 are secured which extend across the table and are spaced above the upper surface of the same. The conveyer bars 19 are spaced apart a distance sufficient to form pockets accommodating the ears of corn between the same with the ears arranged parallel with the bars, and the operator places the ears between the bars at the front end of the table and as the conveyer chains are turned, the ears are propelled sidewise along the table to the debutting and husking devices.

Figures 5, 11, 12, 13:
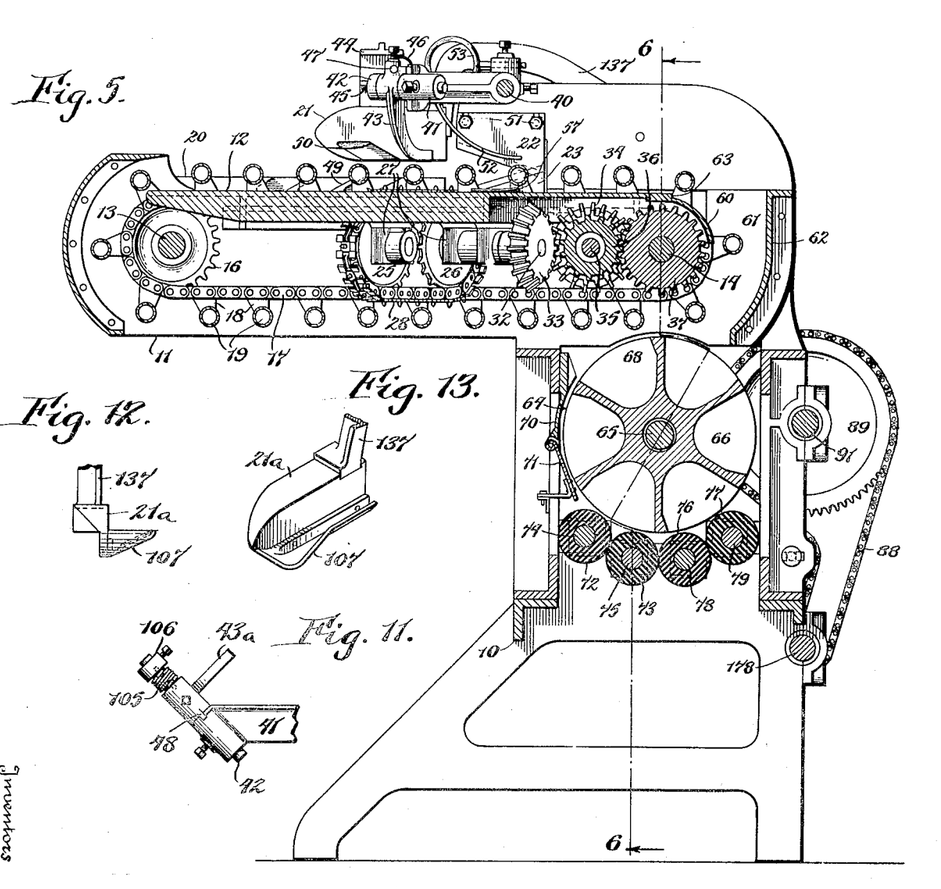
Figure 5 is a vertical longitudinal section taken on line 5—5, Fig. 2.
Figure 11 is a top plan view of a modified form of movable finger for engaging the upper sides of the ears of corn and holding them in engagement with the placing devices.
Figure 12 is a front end elevation of a modified form of shoe for engaging the butts of the ears presented to it by the placing device.
Figure 13 is a perspective view of the shoe shown in Fig. 12.

The operator places the ears of corn at opposite sides of the table with their butts extending outwardly and with the butts adjacent stationary gage plates or shoulders 20 which are secured to the frame in any suitable manner adjacent the outer sides of the conveyer chains 17 and extend above the level of the table as indicated in Fig. 5. Each of these stationary gage plates cooperates with a movable gage shoe 21 in engaging the butt of each ear and positioning the ear by its butt so that the butt is severed at the proper place by the debutting knives 22 and 23 which subsequently engage the ear.

Figure 7:
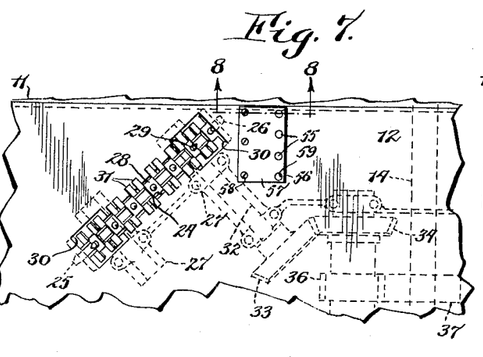
Figure 7 is an enlarged fragmentary top plan view of the feeding table showing the ear placer.

To move the butts of the ears of corn against the gage plate 20 and the movable gage shoe 21, an ear placing device is provided on each side of the table adjacent the gaging members, which placing devices are similar in construction and operation and hence the following description of one will be deemed to apply to both:

As best shown in Fig. 7, a diagonal slot 24 is provided at each side of the feed table 12, each of these slots extending diagonally outwardly and rearwardly toward the gage shoe 21. Below each of these slots a pair of sprocket wheels 25 and 26 are mounted in suitable bearings 27 hung from the feeding table 12, and these sprockets carry a diagonal placing chain 28. The upper stretch of each of these placing chains 28 passes up through the the slot 24 and alternate links thereof carry teeth or spurs 29 which are adapted to engage the undersides of the ears of corn as the ears are propelled over the same by the main conveyer. The ends 30 of the slots 24 are preferably enlarged, and, as indicated in Fig. 7, the links of the placing chain which are not provided with spikes 29 are formed to provide wings 31 which pass through the enlarged ends of the slots 24 and rest on the upper surface of the table while that portion of the chain traverses its upper stretch. By this means the upper stretch of each placing chain is supported by the table and prevented from sagging.

The sprocket wheel 26 of each placing device is mounted on a diagonal drive shaft 32, to the rear end of which a miter gear 33 is fixed. Each of the miter gears 33 meshes with a miter gear 34 mounted on a transverse shaft 35. This shaft is suitably supported from the main frame and carries a pinion 36 which, as best shown in Fig. 5, meshes with a gear 37 mounted on the conveyer drive shaft 14. It is therefore apparent that as the conveyer drive shaft 14 is turned to advance the conveyer chains 17 and bars 19 and the ears carried thereby, the placer chains 28 through the gear 37, pinion 36, shaft 35, miter gear wheels 34 and 33, shafts 32 and sprockets 26, are each turned so that the upper stretch thereof is moved toward the gaging devices. Since the spurs 29 engage the undersides of the ears, the ears are moved but first outward and into engagement with the gage plate 20 and shoe 21 for proper gaging with reference to the butt severing knives. The movement of the placer chains 28 is so timed that they move somewhat faster than the conveyer chains 17 and at an equal rate lengthwise of the table. That is, any part or point on the upper stretch of each placer chain stays in the same relative position to the conveyer bars 19 and merely moves lengthwise thereof. By this means the placer chains neither tend to advance the ear in its sidewise movement or to retard the same but operate solely to move the ear lengthwise against the gage members while it is being conveyed sidewise by the main conveyer.

Figure 1:
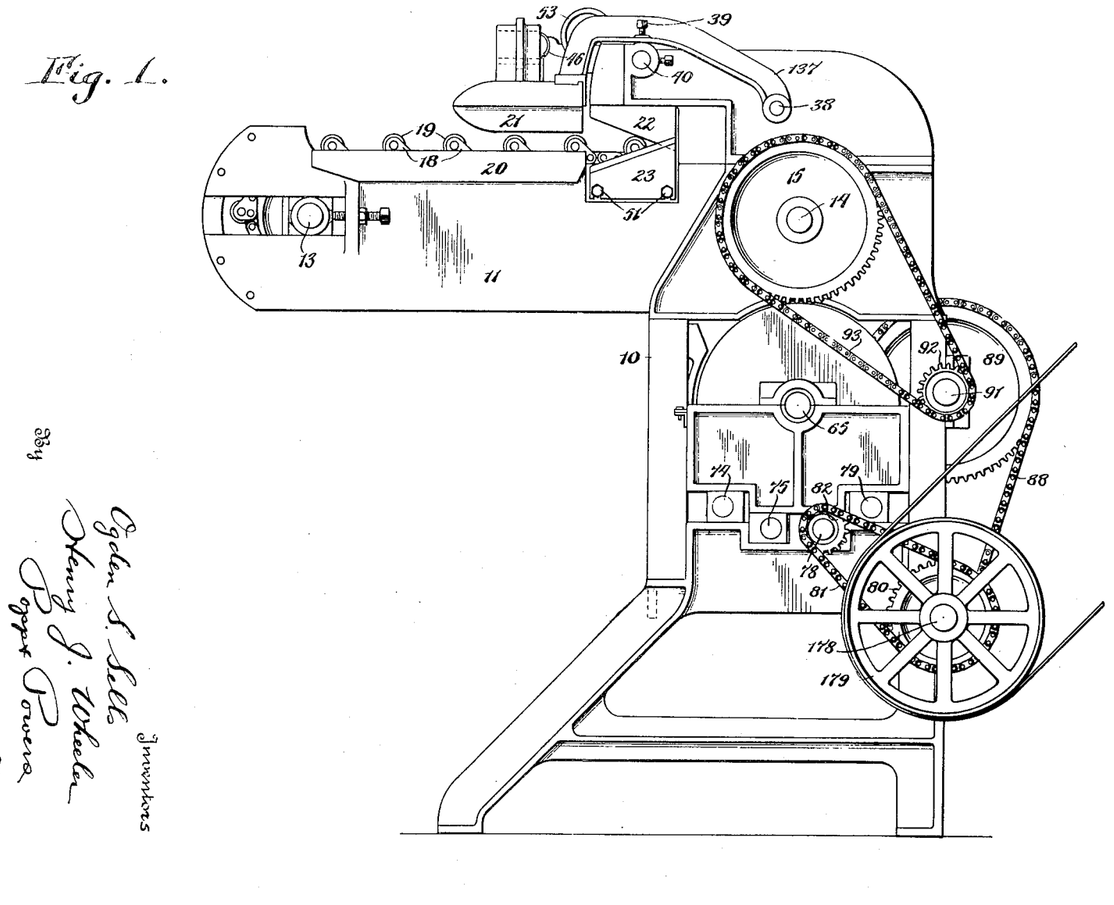
Figure 1 is a side elevation of a machine embodying our invention.

Each of the gage shoes 21 is bullet shaped in outline, the nose thereof being rounded to carry the butts downwardly as they are conveyed by the conveyer in the event that they are not in proper position. Each gage shoe 21 is removably mounted on an arm 137 which, as best shown in Fig. 1 is pivotally mounted on a pin 38, this pin being carried by the main frame some distance in rear of the shoe 21 and in line with the same. The arm 137 preferably is arched and carries an adjustable stop screw 39 which engages a part of the main frame and limits the downward movement of the arm.

Figure 2:
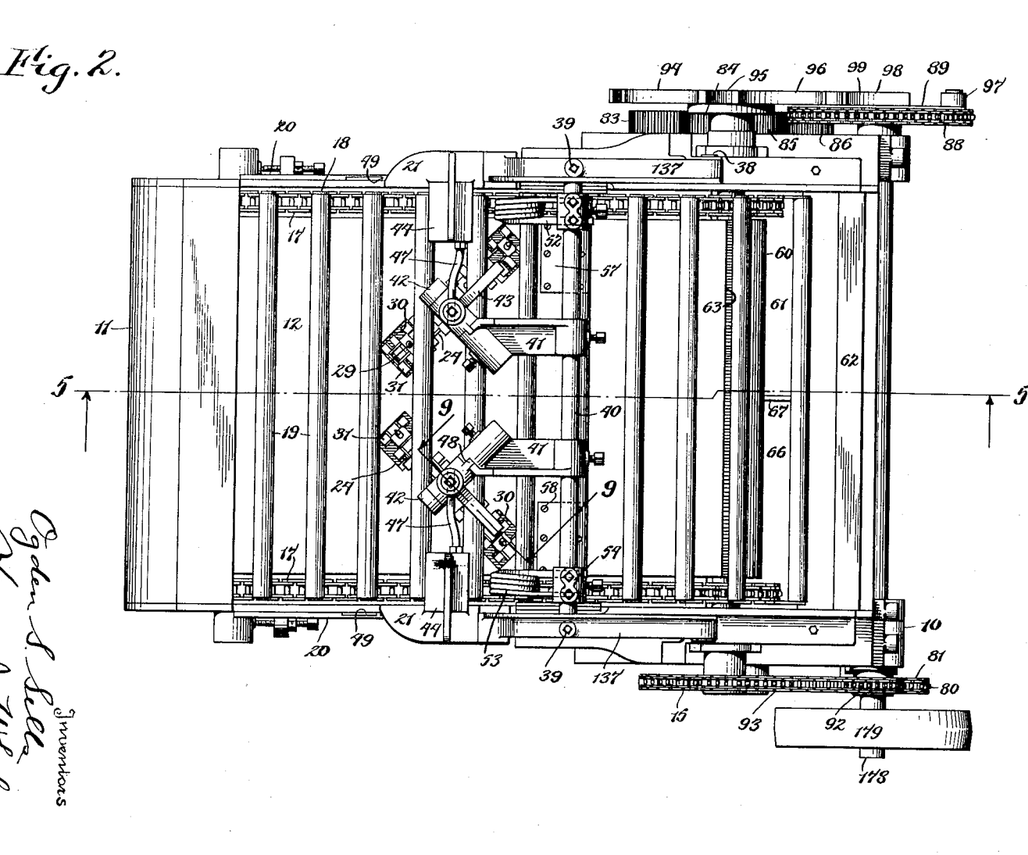
Figure 2 is a top plan view thereof.
Figure 3:
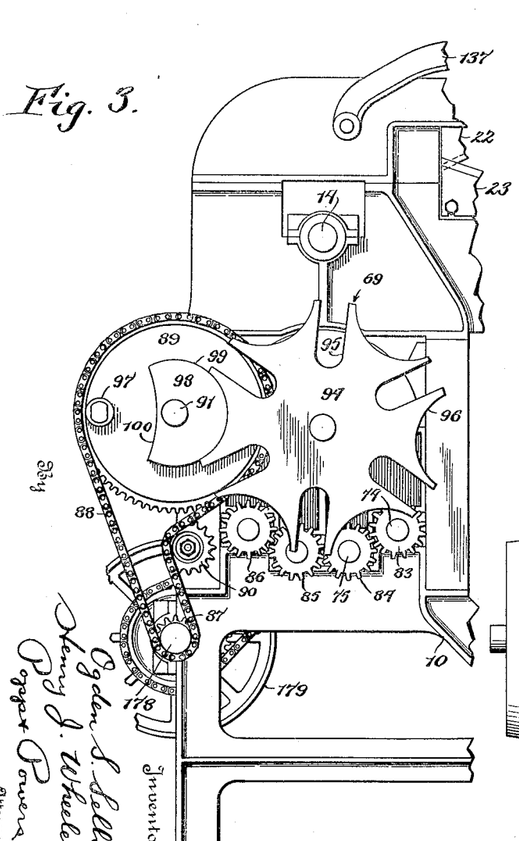
Figure 3 is a fragmentary side elevation viewed from the side opposite to that shown in Fig. 1.
Figure 4:
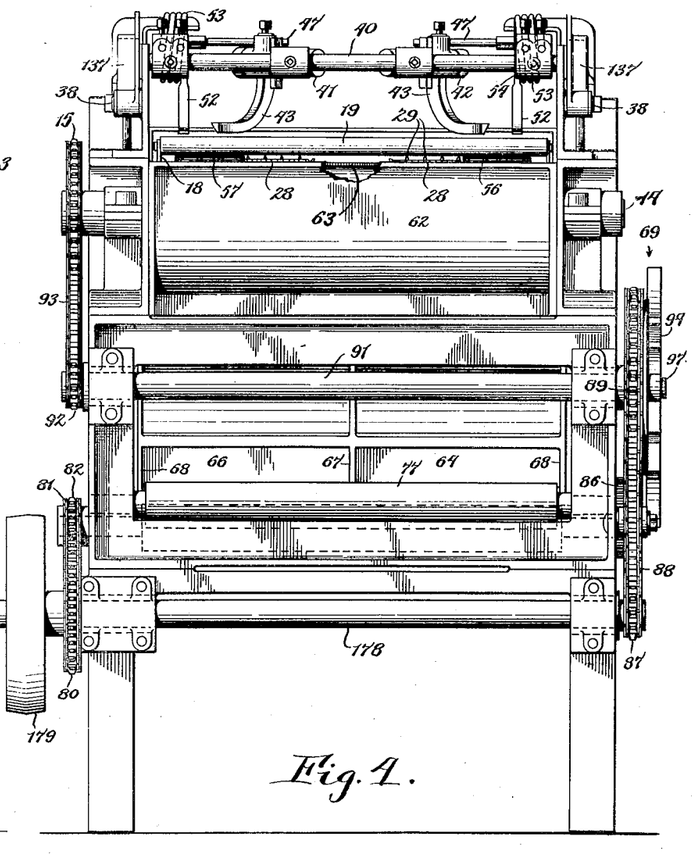
Figure 4 is a rear elevation of the machine.

Arranged below the stop screw 39 is a fixed cross bar 40, which, as best shown in Fig. 4 extends across the conveyer and carries a pair of fixed supporting arms or brackets 41. As best shown in Fig. 2, each of these arms or brackets 41 extends forwardly from the cross rod 40 and at its outer or forward end is formed to provide a diagonally outwardly extending horizontal socket which carries a headed pin 42. On each of these pins a finger 43 is pivotally mounted, the lower end of this finger being curved and being arranged in the path of the corresponding procession of ears on the main conveyer. On its inner side each of the shoes 21 is formed to provide an upper jaw 44 and a lower jaw 45 and between these two jaws a roller 46 carried by an arm 47 is arranged. The arm 47 is arranged transverse to the line of movement of the ears and hence oblique to the line of movement of the finger 43 and at its end passes through and is secured to the upper end of the finger 43.

It is therefore apparent that since the arm 47 and roller 46 is arranged to the rear of the axis of the finger 43, that when the finger 43 is raised by a passing ear of corn that the arm 47 and roller 46 will be swung upwardly thereby lifting the shoe 21 correspondingly. When the ear of corn passes the finger 43, the shoe 21 and finger 43 together return to their normal position as determined by a stop screw 39 on the shoe and a stop 48 carried by the finger. It is also apparent that the greater the diameter of the ear, the higher the finger 47 will be raised and that therefore the shoe 21 will be correspondingly raised a greater extent. By this means the gage 21 is opened or lifted to conform to the size of the ear being gaged and it therefore follows that when an unusually large ear is being gaged that the shoe 21 will be lifted to permit a greater extent of its butt to be received between the gage shoe 21 and the gage plate 20 and hence the ear properly positioned to insure the butt being cut off beyond the point where the leaves of the husk join the stem. By this means each ear is gaged and positioned according to its size and hence the butts are likewise severed at the proper places and the ears are therefore put in proper condition for husking.

Figure 10:
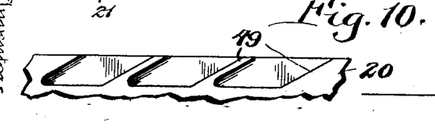
Figure 10 is a fragmentary side elevation, viewed from the inner side of the gage shoulder which positions the butts of the ears of corn preparatory to severing the same.

In order to cause the butt of the ear of corn to ride up on the gage plate 20 for proper gaging by the gage shoe 21, the inner side of each gage plate 20, as best shown in Fig. 10, is provided with a series of inclined teeth or inclined shoulders 49 these teeth being formed by recessing the inner face of the gage plate 20 and these teeth or shoulders inclining upwardly and rearwardly. In the event, therefore, that the stem of the ear is placed so that it butts against the side of the gage plate 20, the end of he same rides up on one of the inclined shoulders or teeth 49 and finds its way over the gage plate to permit of severing the butt. In a similar manner, a downwardly and rearwardly inclined shoulder 50 is formed on the inner face of each of the gage shoes 21, this shoulder tending to move the end of the ear downwardly and into proper position between the gage shoe 21 and the gage plate 20.

The cutting knives 22 and 23 are arranged in pairs on opposite sides of the machine and are suitably removably bolted to the main frame 23 by bolts 51 or otherwise. The cutting edges of the two knives are inclined and together form a cutting notch or V into which the butt end of the ear is carried by the main conveyor mechanism and the butt severed at a point determined by the movable gaging shoe 21.

To prevent the ear of corn from up ending while its butt is being severed, hold down devices are provided which engage the body of each ear while the ear is passing the cutting knives 22 and 23. As best shown in Fig. 5, these devices each comprise a spring finger 52 which is coiled at its upper end as indicated at 53 and the upper end thereof is secured in a collar 54 which collar is suitably secured to the fixed cross rod 40. These spring fingers are preferably flattened at their lower ends.

Figure 8:
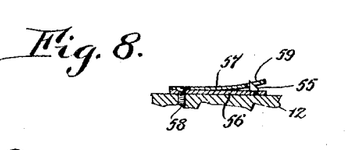
Figure 8 is a fragmentary longitudinal section through the feeding table taken on line 8—8, Fig. 7 and showing one of the shredding fingers.
Figure 9:
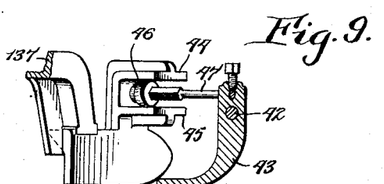
Figure 9 is a vertical diagonal section taken on line 9—9, Fig. 2 and showing the gaging mechanism.

Before the ears pass to the husking rolls, the husks are torn or shredded so as to loosen them and provide loose ends which permit the husks to be gripped by the rolls and torn from the ears. This is accomplished during the butt severing operation by a series of pointed teeth 55 which project upwardly from a plate 56 mounted on the feeding table 12 adjacent each pair of debutting knives. To prevent the accumulation of pieces of husk and silk in front of these teeth, which would render them inoperative, a spring guard 57 is provided for each series of teeth and normally covers the same. As best shown in Fig. 8, each of these spring guards 57 is in the form of a plate which is secured at its front end by means of screws 58 which also hold the plate 56 to the feeding table, and this spring plate is provided with holes 59 which receive the teeth 55 when the spring plate is sprung downwardly. The ears of corn in passing over the spring plate 57 are forced down under the influence of the holddown spring fingers 52 and force the spring plate 57 downwardly and thereby expose the teeth 55 which bite into the husk of the ear as it passes and tear the husk. After the ear passes, the spring plate 57 is released and in returning clears the teeth 55 from any bits of silk or husk which have lodged against the same.

The debutted and shredded ears are then conveyed along the feeding table 12 by the main conveyer and are carried around the rounded downturned end 60 at the rear end of the table and into a vertical way or passage 61 formed by a rear frame cross plate 62. This downturned rear part 60 of the feeding table 12 is concentric with the axis of the conveyer drive shaft 14 and to prevent the ears from being caught in the conveyer while being carried around this downturned part, the outer face of the same is spaced closer to the drive shaft 14 than the horizontal part of the feed table, thereby forming a step 63 between these two parts of the feed table. It has been found in practice that by the provision of this step and relatively depressed rounded rear part 60 on the feeding table, that the ears are conveyed over the end of the feeding table and into the vertical way 61 easily and without being caught or jammed between the conveyer bars 19 and the rounded part 60 of the table, this step or drop 63 permitting the ears to drop and giving more room for any husks which may have been drawn back under the bars 19 to free themselves so as to transfer efficiently to the chute 61 and not carry around past the feeding drum. In machines used where the rounded part 60 formed a continuation of the horizontal part of the feeding table, ears frequently became jammed or caught in the conveyer and had to be cleared.

Below the vertical way or passage 61 is arranged a drum or cylinder 64 which is fixed on a transverse shaft 65, this shaft being suitably journaled in the main frame. This drum is formed to provide two series of longitudinally extending pockets 66, one series being arranged on each side of the drum and the two series being separated by a partition 67, the outer ends of the pockets being closed by end heads 68.

To this drum is imparted a step-by-step movement by means of a Geneva gear 69 as hereinafter described, and its movement is so synchronized with the conveyer that as a pair of ears is being discharged from the vertical way 61 by the conveyer a pocket 66 is in position to receive each of the ears, and before the next pair of ears is discharged from the conveyer, the drum is rotated to bring the next succeeding pair of empty pockets into position to receive them. One ear is therefore received in each pocket and the ears are therefore individually carried around by the drum.

In front of the drum a transverse baffle plate 70 is secured to the main frame and to the lower end of this baffle plate 70 a movable baffle plate 71 is pivotally mounted, this baffle plate being movable away from the drum to permit of the removal of ears from the pockets and nubs or other small pieces from the front pair of husking rolls 72 and 73. The fixed baffle plate 70 is also spaced from the lower stretch of the main conveyer to provide a space therebetween by means of which ears improperly received in the pockets of the drum are caught by the conveyer and thrown out of the machine.

While one pocket 66 is being held in position to receive an ear of corn from the conveyer, the opposite pocket is disposed over the first pair of husking rolls 72 and 73. These husking rolls are made of rubber and are carried by transverse shafts 74, 75 which are journaled in bearings carried by the main frame. The rolls are continuously rotated in opposite directions so that their opposing faces pass downwardly to draw the husks of the ear of corn downwardly between them and remove them from the ear. It is therefore apparent that for a definite period each ear is positively held in engagement with the first set of husking rolls 72 and 73 by the pocket of the drum in which it is arranged.

On the next forward step of the drum, the partly husked ear is removed from the first or primary set of husking rolls onto a second set of husking rolls 76, 77 which are mounted on continuously rotating shafts 78, 79 and serve to remove the remainder of any husks on the ears. On the next forward step of the drum, the completely husked ears are discharged from the pocket and the rear end of the machine. By providing a dwell or two separate periods in which the ear is positively held in engagement with two pairs of husking rolls, the complete removal of the husks from the ear is insured as well as all remnants of silk.

The driving gearing for the machine is arranged as follows:

The numeral 178 represents a main drive shaft which is journaled at the rear end of the main frame and carries a driving pulley 179 which is driven by a belt drive or in any other suitable manner.

Between the driving pulley 179 and the main frame a sprocket wheel 80 is fixed to the drive shaft and this sprocket wheel is connected by a driving chain 81 with a small sprocket 82 mounted on the shaft 78 which carries the first husking roll 76 of the second pair of rolls. At the opposite side of the machine the husking roll shafts 74, 75, 78 and 79 are connected by a train of pinions 83, 84, 85, 86 which compel all of the husking rolls to turn in unison and in the proper direction to strip the husks from the ears as they are successively presented to the two pairs of rolls.

On the opposite side of the machine, the main drive shaft 178 carries a sprocket 87 which drives an endless chain 88. This chain passes around and drives the driving wheel 89 of the Geneva gear 69 and thence around an idler 90. The driving wheel 89 of the Geneva gear is fixed on a transverse shaft 91 on the opposite end of which a sprocket 92 is carried. This sprocket 92 is connected to the main conveyer driving sprocket wheel 15 by a chain 93 and since the train of gearing as described is continuously rotating, the conveyer is advanced uniformly and continuously.

The driven star wheel 94 of the Geneva gear 69 is mounted on the shaft 65 which carries the drum 64. This star wheel is provided with the usual radial slots 95 and indented faces 96 between the slots. The driving wheel 89 of the Geneva gear carries a roller 97 which on each turn of the driving wheel 89 enters the adjacent slot 95 and gives the star wheel 94 a sixth of a turn. By this means on each rotation of the driving gear wheel 89, the star wheel 94 is advanced a sixth of a turn and the six pockets in the drum 64 driven by the star wheel are successively presented to the vertical way 61, first pair of husking rolls 72, 73 and the second pair of husking rolls 76, 77. In order to hold the star wheel 94 against rotation while the same is not being advanced by the driving wheel roller 97, a stop 98 is mounted on the driving wheel 89 which comprises a semi-cylindrical face 99 which is adapted to contact with the indented faces 96 and hold the star wheel against turning while the roller 97 is traversing its idle stretch. The side of the stop 98 adjacent the roller is cut away as indicated at 100 to receive the points of the star wheel and permit it to be turned by the roller 97.

A summary of the operation of the machine is as follows:

The operator places a pair of ears of corn with their points opposing each other between a pair of conveyer bars 19 of the main conveyer, and preferably with their butts arranged over the side gage plates 20. As the ears are carried along sidewise by the conveyer, the butts engage the inclined shoulders or teeth 49 on the side plates which tends to lift them upon being moved endwise to properly engage the butts with the gaging plate and shoe. The ears are carried along until their undersides are engaged by the teeth 29 of the diagonal placing chain 28 the upper stretch of which moves outwardly and in timed relation to the conveyer chain so that the ears are moved outwardly or butt first against the opposing shoulders formed by the gage plates 20 and the gage shoes 21. As the ears pass along they lift the fingers 43 which rock their respective arms 47 upwardly and elevate the gage shoes 21 in accordance with the size of the ears being gaged. By this means the larger the ear, the larger the gage opening between the plate 20 and shoe 21 and hence each ear is selectively positioned in accordance with its size with reference to the debutting knives to insure debutting at the proper place for effective husking.

The ears so positioned are then carried past the debutting knives 22 and 23 which sever the butts and over the shredding fingers 55 which tear or shred the husk of the same. The debutted pair of ears are then carried over the shoulder 63, around the curved part 60 of the feeding table, through the vertical way 61 and discharged into the two upper pockets at the opposite ends of the drum 64. This drum is rotated step-by-step in synchronism with the main conveyer by the Geneva gear 69, and the pair of ears are thereby first presented and held in engagement with the first pair of continuously rotating husking rolls 72 and 73 and upon the next step of the drum are held in engagement with the second pair of continuously rotating husking rolls which latter operate to remove any husks or silk not removed by the first pair of husking rolls. On the next step of the drum, the pair of ears are thrown out of the pocket and from the rear end of the machine completely husked.

Fig. 11 illustrates a modified form of finger 43—a, each of which is similar to each of the two fingers 43 and is similarly pivoted for vertically swinging movement on a diagonally extending pin 42 which extends horizontally outward from a bracket 41 carried by the fixed cross bar 40, each of these fingers 43—a curving downwardly and rearwardly over the placer chains 28 so as to hold the ears in engagement there-with. In the modified form shown in Fig. 11, this finger 43 has no connection with the movable gage shoe 21 and therefore does not operate or function to gage the ears according to their size or diameters as in the construction shown in Figs. 1–10. Instead this finger is held down by a helical spring 105 the opposite ends of which engage the hub of the finger 43—a and a collar 106 which is fixed to the pin 42. The tension of each of these springs 105 tends to depress the finger 43—a and hold the passing ears against the placing chain 28.

A movable shoe 21—a suitable for use in connection with the spring finger as illustrated in Fig. 11 is shown in Figs. 12 and 13. These shoes 21—a are mounted for vertical movement on the arms 137 in the same manner as the shoes 21 in the construction shown in Figs. 1–10 and are similarly bullet-shaped, the front ends being pointed so that the stalks of the ears can freely ride under the same. To the inner side of the shoe 21—a is suitably secured an inclined gage plate 107, this gage plate being enlarged at its front end and its under surface inclining inwardly and upwardly from the lower edge of the shoe 21—a. When the ears are moved butt first and sidewise toward the gage shoes 21—a by the placer chains 28, the butts first engage the under sides of the inclined plates 107 and lift the same. The downward pressure of the weight of the shoes 21—a forces the gage plates 107 against the butts of the ears of corn and thereby presses the ears down while they are being moved butt first by the placer chain 28 and thereby insures these butts being properly engaged by the gage plates 20 which position the ears properly relative to the severing knives 22 and 23. This gage shoe 21—a is therefore moved solely by the butt engagement of the ear and in no way affects the actual positioning of the ear, this positioning being determined wholly by the gage plate 20. As a whole the different forms of this invention provide a relatively simple and inexpensive machine which rapidly, uniformly and thoroughly severs the butts and removes all of the husk and silk from the ears fed to the same, the machine is reliable and positive in its operation and is not liable to become clogged with silk or husks and ears are not liable to become misplaced or jammed in the machine and if so misplaced can be readily and quickly removed.

We claim as our invention:

1. In a corn debutter, means for conveying the corn, a stationary gage shoulder, a gage shoe movable toward and from said shoulder, means for engaging the butt ends of the ears of corn with said shoulder and shoe and means for moving said shoe toward and from said shoulder in response to the size of the ears being engaged, comprising a finger arranged in the path of the ears of corn and adapted to be moved by the passing ears and means operatively connecting said shoe and finger.

2. In a corn debutter, a frame, a conveyer for conveying the ears of corn sidewise and in spaced relation along said frame, a stationary gaging shoulder at one side of said conveyer, a forwardly extending arm pivotally mounted at the rear of said frame, a gaging shoe carried at the front end of said arm and movable toward and from said gaging shoulder, a placer for moving the ears of corn endwise and butt first into engagement with said shoulder and shoe, a stationary debutting knife arranged alongside said conveyer between the pivotal connection of said arm and said shoe and means for moving said shoe toward and from said shoulder in response to the size of the ears being gaged.

3. In a corn debutter, a gaging shoulder, a gaging shoe movable toward and from said shoulder, means for moving the butts of the ears of corn into engagement with said engaging shoulder and shoe, and means for moving said shoe toward and from said shoulder comprising a finger pivotally mounted to project into the path of the ears of corn, an arm projecting laterally from said finger, and means connecting the outer end of said arm with said shoe.

4. In a corn debutter, a gaging shoulder, a gaging shoe movable toward and from said shoulder, means for moving the butts of the ears of corn into engagement with said gaging shoulder and shoe, and means for moving said shoe toward and from said shoulder comprising a finger pivotally mounted to project into the path of the ears of corn, an arm projecting laterally from said finger, a jaw formed on said shoe, the outer end of said arm engaging said jaw to move said shoe away from said shoulder when said finger engages an ear of corn.

5. In a corn debutter, a conveyer for moving the ears of corn sidewise and in spaced relation, a gaging shoulder arranged alongside said conveyer, a gaging shoe movable toward and from said shoulder, means for moving the ears of corn endwise and butt first into engagement with said gaging shoulder and shoe and means for moving said shoe toward and from said shoulder in response to the size of the ears being gaged comprising a finger pivotally mounted to project into the path of the ears of corn being gaged, the axis of said finger being diagonal to the direction of movement of the corn, an arm projecting laterally from said finger and means connecting the outer end of said arm with said shoe.

6. In a corn debutter, a frame, a conveyer for moving the ears of corn sidewise and in spaced relation, a gaging shoulder arranged alongside said conveyer, a gaging shoe movable toward and from said shoulder, means for moving the ears of corn endwise and butt first into engagement with said gaging shoulder and shoe and means for moving said shoe toward and from said shoulder comprising a cross rod carried by said frame, a bracket carried by said rod, a bearing rod carried by said bracket and arranged obliquely to the line of movement of said corn, a finger pivotally supported on said bearing rod, the lower end of said finger depending into the path of the ears of corn conveyed thereunder, and an arm carried by said finger above said bearing rod and projecting laterally therefrom, the outer end of said arm being connected to said shoe to raise and lower shoe and finger in unison.

7. In a corn debutter, a feeding table, a slatted conveyer spaced above the table and moving lengthwise of said table, a gaging device and a debutting device adjacent the side of said table and a placing device comprising an endless conveyer arranged to one side, vertically, of said slatted conveyer and arranged diagonally to the line of movement of said ears along said table, means carried by said diagonal conveyer to engage the ears of corn passing over the table and means for moving the diagonal conveyer to move said last named means toward said gaging device in timed relation to said slatted conveyer, said diagonal conveyer being so timed as not to crowd the ears of corn against said slatted conveyer nor to advance said ears relative to said slatted conveyer.

8. In a corn debutter, a feeding table, a slatted conveyer spaced above the table and moving lengthwise of said table, a gaging device and a debutting device adjacent the side of said table and a placing device comprising an endless conveyer extending through the table and arranged below the first conveyer and arranged diagonally to the line of movement of said ears along said table, means carried by said diagonal conveyer to engage the undersides of the ears of corn passing over the table, and means for moving the diagonal conveyer to move said last named means toward said gaging device in timed relation to said slatted conveyer, said diagonal conveyer being so timed as not to crowd the ears of corn against said slatted conveyer nor to advance said ears relative to said slatted conveyer.

9. In a corn debutter, a feeding table, a slatted conveyer spaced above the table and moving lengthwise of the table, a gaging device and a debutting device adjacent the side of said table and a placing device comprising an endless chain extending through the table and arranged below the slatted conveyer and arranged diagonally to the line of movement of said ears along said table, the opening in said table for said diagonal chain comprising a slot having enlarged ends one of which is arranged adjacent said gaging device, wings extending laterally from the links of said chain and engaging the upper side of said table to support the upper stretch of the chain passing along said slot, spurs carried by said chain and adapted to engage the undersides of the ears of corn passing over the table and means for moving the chain to move said spurs toward the gaging device in timed relation to said slatted conveyer, said diagonal conveyer being so timed as not to crowd the ears of corn against said slatted conveyer nor to advance said ears relative to said slatted conveyer.

10. In a corn debutter, a feeding table, a slatted conveyer spaced above the table and moving lengthwise of said table, a gaging device and a debutting device arranged adjacent the side of said table and a placing device comprising an endless chain extending through the table and arranged below the slatted conveyer and arranged diagonally to the line of movement of said ears along said table, a pair of sprocket wheels arranged under said table and carrying said diagonal chain, spurs carried by said chain to engage the undersides of the ears of corn passing over said table and means for turning one of said sprocket wheels to move said spurs toward said gaging device in timed relation to said slatted conveyer, said movement being so timed as not to crowd the ears of corn against said slatted conveyer nor to advance said ears relative to said slatted conveyer.

11. In a corn debutter, a feeding table, a conveyer for conveying the ears of corn sidewise along the top of said table from one end thereof to the other, a stationary gage rail projecting upwardly from one side of said table and extending longitudinally thereof, and means for moving the ears being conveyed butt first toward the side of said gage rail to be positioned and gaged thereby, the upwardly projecting part of said rail being formed intermediate its ends and on the side facing said table with at least one inclined shoulder which extends upwardly and rearwardly.

12. In a corn debutter, a feeding table, a conveyer for conveying the ears of corn sidewise along the top of said table from one end thereof to the other, a stationary gage rail projecting upwardly from one side of said table and extending longitudinally thereof, and means for moving the ears being conveyed butt first toward the side of said gage rail to be positioned and gaged thereby, the upwardly projecting part of said rail being formed intermediate its ends and on the side facing said table with a plurality of inclined shoulders which extend upwardly and rearwardly.

13. In a corn debutter, a feeding table, a conveyer for conveying the ears of corn sidewise along the top of said table from one end thereof to the other, a gage shoulder projecting upwardly from one side of said table, a movable shoe arranged above said shoulder and cooperating with said shoulder to limit the movement of an ear of corn, means for moving the ears being conveyed butt first toward the side of said shoulder and shoe, said shoe being formed intermediate its ends and on the side facing the table with at least one inclined shoulder which extends downwardly and rearwardly.

OGDEN S. SELLS.
HENRY J. WHEELER.